Aug. 18, 1964   C. A. OLLANKETO   3,145,029
TANDEM SLEDS

Filed July 17, 1962   2 Sheets-Sheet 1

INVENTOR.
CLIFFORD A. OLLANKETO
BY
ATTORNEY

Aug. 18, 1964     C. A. OLLANKETO     3,145,029
TANDEM SLEDS

Filed July 17, 1962

INVENTOR.
CLIFFORD A. OLLANKETO
BY
ATTORNEY

United States Patent Office 3,145,029
Patented Aug. 18, 1964

3,145,029
TANDEM SLEDS
Clifford A. Ollanketo, 2009 W. 21st St.,
Minneapolis, Minn.
Filed July 17, 1962, Ser. No. 210,355
4 Claims. (Cl. 280—16)

My present invention relates broadly to sleds; more particularly to a sled primarily intended for use in coasting on ice or snow covered surfaces; and specifically to a sled of the type described wherein a plurality of single sled units may be attached together in tandem arrangement of form a train.

The principal object of this invention is to provide a coasting sled each of which is an independent unit but which may be detachably or permanently in tandem arrangement to one or more identical units.

A further object of this invention is to provide a coasting sled that is entirely of unitary construction and which may be fabricated of plastic or sheet metal.

Another object of this invention is to provide a coasting sled each of which affords a complete independent unit but having flexible connectors attached thereto for securing one sled unit to another in tandem arrangement.

Still another object of this invention is to provide a coasting sled of the class described, said sled being in the form of a relatively shallow pan having integral runners in the bottom portion thereof to insure travel of the sled in a straight line unless otherwise steered.

A still further object of this invention is to provide a coasting sled that is relatively inexpensive to manufacture of molded plastic or sheet metal; that is rugged and safe for the smallest children.

Another object of this invention is to provide a sled having at least one identical trailed unit in tandem arrangement preferably of non-metallic construction and wherein the flexible connections therebetween are also of molded plastic of the same type as that from which the sled itself is molded.

These and other objects of the invention will become apparent from the following specification and claims when taken in conjunction with the accompanying drawing in which drawing like characters indicate like parts throughout the several views.

To the above end, generally stated, the invention consists of the following devices and combination of devices hereinafter described and defined in the claims.

Referring to the drawings.

Figure 1:
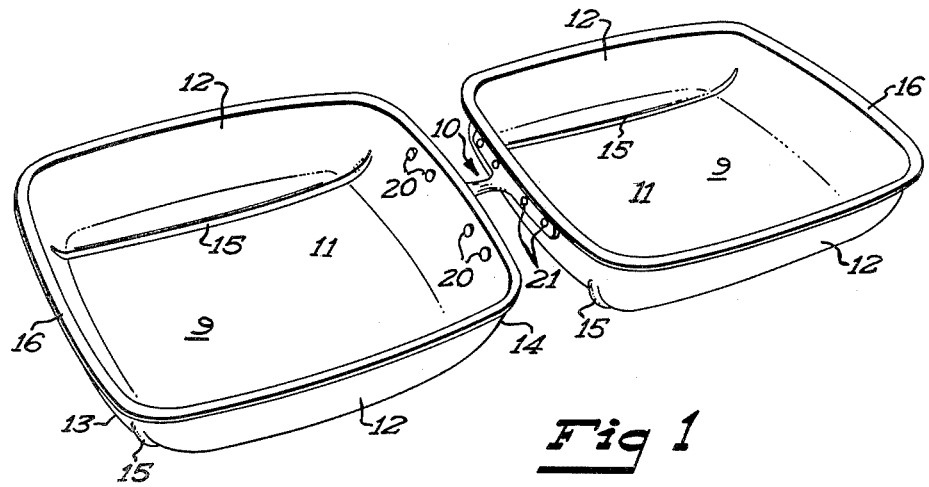
FIG. 1 is a perspective view of two of the sled units connected in tandem arrangement.
Figure 2:
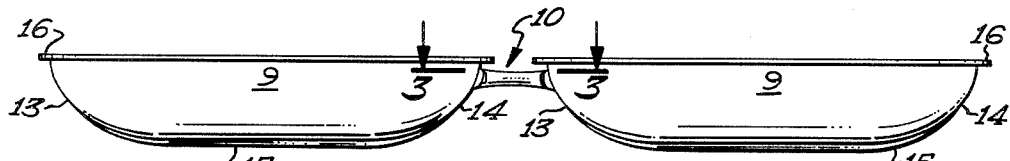
FIG. 2 is a side elevational view of the same.

It will be understood that while it has been stated that any number of sled units may be connected the one to the other in tandem arrangement to form a train, that for all practical purposes the sled will be generally used with two sled units in said tandem arrangement. It will be further understood that while it has also been stated that the sled units are preferrably formed of molded plastic or stamped from sheet metal that in this application it will be assumed that the units are of plastic construction.

For the purpose of this application and in the interest of clarity the independent sled units as illustrated in FIGS. 1, 2, 3 and 5 will hereinafter be identified by the numeral 9 and the flexible connectors therefor by the numeral 10.

The independent sled units 9 are in the form of a slightly elongated pan having a bottom portions 11, upwardly and outwardly inclined side portions 12, an upwardly and outwardly front end portion 13, and an upwardly and outwardly inclined near end portion 14. Each unit 9 is provided with a pair of integral laterally spaced, longitudinally disposed, runners 15 and to impart rigidity to the said side and front and rear portions a peripheral flange 16 is provided.

Figure 3:
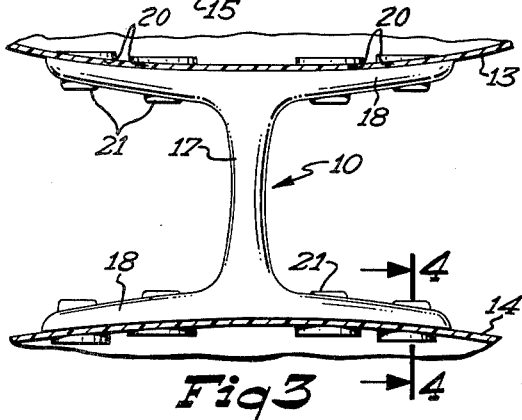
FIG. 3 is a view fragmentarily showing the sled units of FIGS. 1 and 2 with the connector shown on an enlarged scale, taken on the line 3—3 of FIG. 2.
Figure 4:
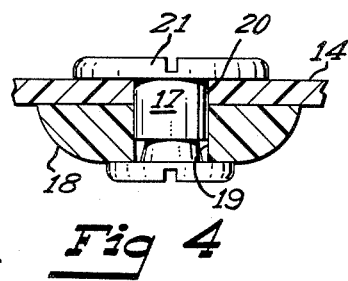
FIG. 4 is a fragmentary sectional view taken on the line 4—4 of FIG. 3.
Figure 5:
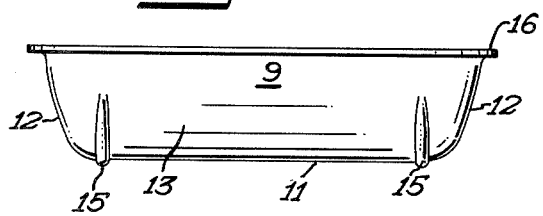
FIG. 5 is a front elevational view of a single sled unit.

As best illustrated in FIG. 3 the independent sled units 9 are connected the one to the other, by means of a flexible connector 10 that is preferably formed of a heavy plastic material the same as that of which the sled proper is formed. This connector, in the form as illustrated in FIGS. 1, 2, 3, 4 and 5, is characterized by a relatively narrow but heavy flexible central web 17 having relatively narrow transversely flanged end portions 18. These flanged end portions 18 are provided with bores 19 which are in alignment with bores 20 in the front and rear end portions 13 and 14 respectively of the sled unit 9 to receive screw-threaded bolts or rivets 21 by which means the connector 10 is secured to the sled sections 9.

Figure 7:
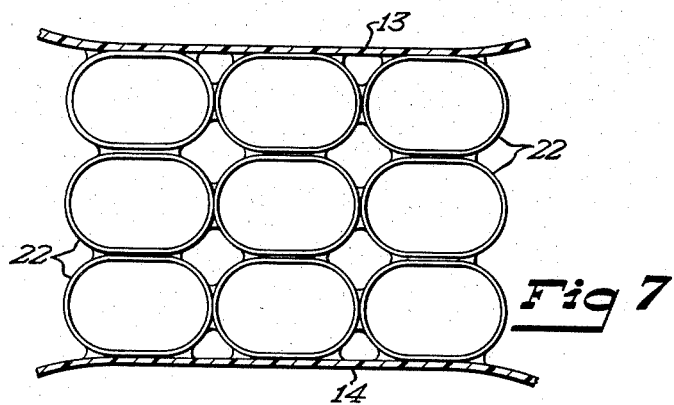
FIG. 7 is a view showing a modified form of a flexible connector.

FIG. 7 illustrates a modified form of flexible connector comprising a plurality of inter-connected elongated annular plastic rings 22 affording a cushioned flexible connection between a pair of sleds 9.

While the drawings do not illustrate any particular means for securing this bank of elongated annular rings 22 to the sled 9 it will be understood that the same may be molded integral with the sled units or may be attached thereto by the same means as described for FIGS. 1, 2, 3, 4 and 5, however, the former construction is to be preferred to form a unitary assembly.

Figure 8:
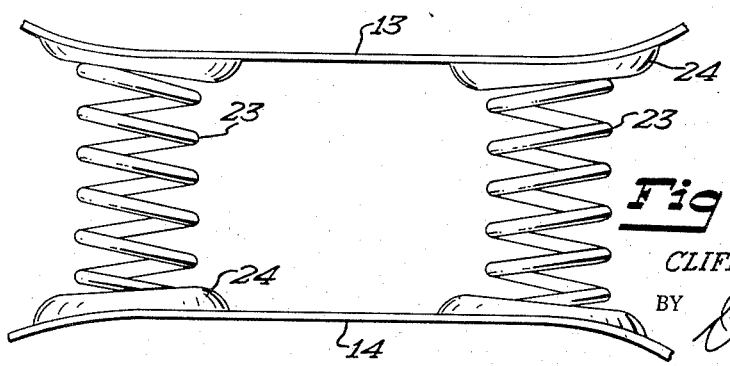
FIG. 8 is a view showing still another form of flexible connector.

FIG. 8 illustrates a still further modified form of flexible connector between a pair of sled units 9 which comprises at least one pair of plastic covered coiled springs 23. These coiled springs 23 are secured in endwise engagement by any suitable means to the sled units 9. As shown, the end portions of the covered coiled springs 23 are seated in relatively heavy bosses 24 which afford the mounting means whereby the said coiled springs 23 are secured to the front and rear end portions 13 and 14 respectively of the sled units 9.

Figure 6:
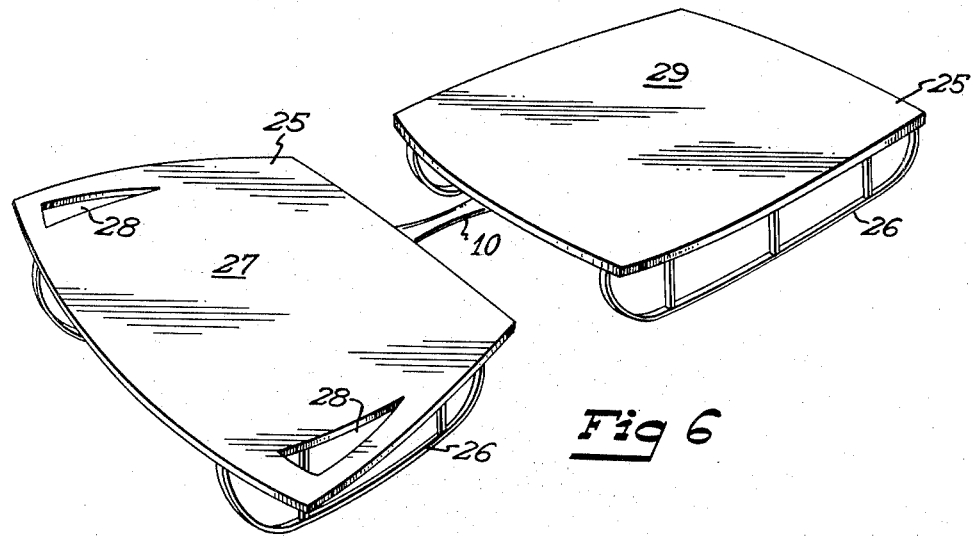
FIG. 6 is a view showing a modified form of sled in tandem arrangement.

FIG. 6 illustrates a modified form of sled unit 9 comprising a forward unit and a rear unit permanently connected in tandem arrangement and using the flexible connector 10. In this modification a flat bed 25 is mounted on a pair of elevated runners 26. The forward unit 27 primarily affords a steering means for the connected units and is provided with hand holds 28 whereby the same may be maneuvered and the rear unit 29 affords a riding section also being provided with elevated runners 26.

While there are herein disclosed but a limited number of embodiments of the invention herein presented, it is possible to produce still other embodiments without departing from the inventive concept herein disclosed, and it is desired, therefore, that only such limitations be improsed on the appended claims as are stated herein or required by the prior art.

What I claim is:

1. A tandem sled comprising in combination, an independent forward unit and at least one trailed unit in tandem arrangement relative to the said forward unit, a flexible connector permanently connecting the said independent forward unit and the said rear trailed unit in longitudinally spaced relation, said flexible connector comprising a relatively heavy flexible central web terminating each end portion thereof in transversely disposed flange plates having bores aligned with bores in the respective sled units to receive threaded screws whereby the said flexible connector is permanently secured to the respective sled units.

2. The structure defined in claim 1 wherein each sled unit comprises a bottom section having at least one pair of laterally spaced longitudinally disposed integral runners, and upwardly and outwardly inclined forward section and rear section and upwardly and outwardly inclined side sections, said forward and rear sections and the said side sections being capped with a peripheral capping flange.

3. A tandem sled comprising in combination, an independent forward unit and at least one trailed unit in tandem arrangement relative to the said forward unit, a flexible connector permanently connecting the said independent forward unit and the said rear trailed unit in longitudinally spaced relation, said flexible connector comprising a bank of inter-connected tubular annular rings formed integral with at least two sled units to connect the same in longitudinally spaced tandem arrangement.

4. A tandem sled comprising in combination, an independent forward unit and at least one trailed unit in tandem arrangement relative to the said forward unit, a flexible connector permanently connecting the said independent forward unit and the said rear trailed unit in longitudinally spaced relation, said flexible connector comprising a pair of laterally spaced longitudinally disposed coiled springs, said coiled springs at each end portion thereof being permanently mounted in rigid basis, said basis being constructed and arranged to be permanently secured to the rear end portion of an independent forward sled section and the forward end portion of an independent rear sled section.

References Cited in the file of this patent

UNITED STATES PATENTS

| | | |
|---|---|---|
| 350,123 | Ferguson | Oct. 5, 1886 |
| 1,453,948 | Pottala | May 1, 1923 |
| 2,219,905 | Prickman | Oct. 29, 1940 |

FOREIGN PATENTS

| | | |
|---|---|---|
| 845,028 | France | May 1, 1939 |
| 207,925 | Germany | Mar. 15, 1909 |
| 113,075 | Switzerland | Dec. 16, 1925 |